United States Patent [19]

Inoue et al.

[11] 4,332,481
[45] Jun. 1, 1982

[54] CONTINUOUS MIXING MACHINE

[75] Inventors: Kimio Inoue, Kobe; Katsumi Ogawa, Amagasaki; Tsugushi Fukui, Miki; Toshihiro Asai; Shinji Hashizume, both of Kobe, all of Japan

[73] Assignee: Kobe Steel, Ltd., Kobe, Japan

[21] Appl. No.: 134,655

[22] Filed: Mar. 27, 1980

[51] Int. Cl.³ .............................................. B29B 1/10
[52] U.S. Cl. ...................................... 366/84; 366/301
[58] Field of Search ...................... 366/84, 76, 75, 79, 366/80, 85, 88, 89, 90, 297, 298, 299, 300, 301, 87; 425/207, 208

[56]  References Cited
U.S. PATENT DOCUMENTS

| | | | |
|---|---|---|---|
| 1,905,755 | 4/1933 | Schnuck | 366/76 |
| 3,360,824 | 1/1968 | Schippers | 366/76 |
| 3,419,250 | 12/1968 | Brennan | 366/301 |
| 3,764,118 | 10/1973 | Matsuoka | 366/84 |

*Primary Examiner*—Robert W. Jenkins
*Attorney, Agent, or Firm*—Oblon, Fisher, Spivak, McClelland & Maier

[57]  ABSTRACT

A continuous mixing machine for mixing a material fed at one end and discharging the mixed material through a discharge orifice at another end in a continuous sequence which includes a plurality of rotors each provided with mixing blade members, a mixing chamber encircling the plurality of rotors and a throttle member defining a part of the mixing chamber at a position facing the blade members and adapted to be moved toward and away from the rotors so as to vary the space within the mixing chamber. In a modified machine, the mixing chamber is provided with a vent hole at a position intermediate the throttle member and discharge orifice.

12 Claims, 11 Drawing Figures

CONTINUOUS MIXING MACHINE

BACKGROUND OF THE INVENTION

1. Field of the Invention

This invention relates to a continuous mixing machine having a superior mixing performance. More particularly, this invention relates to a continuous mixing machine having a plurality of rotors each provided with blade members and a mixing chamber encircling the plurality of rotors.

2. Description of the Prior Art

The known machines for mixing high molecular weight materials such as synthetic resins include, by category, a continuous mixing machine which includes a monoaxial or biaxial rotor and a mixing chamber encircling the rotor; a batch mixer, an example of which is the Banbury mixer, and a screw extruder. Of these machines, the biaxial continuous mixing machine provides the most efficient mixing because of its high shear speed which helps plasticize the material in a short period of time.

Thus, as shown qualitatively in the diagram of FIG. 1, the shear speed of a mixer is inversely proportional to the mixing time required for obtaining a mixed or kneaded product satisfying a given set of quality criteria, and the blocks (A), (B) and (C) of FIG. 1 represent the ranges of characteristics of the continuous mixer, batch mixer and screw mixer, respectively. In the case of a biaxial continuous mixer, the highest shear speed is 1000 sec.$^{-1}$, and at that speed the mixing time is about 10 to 40 seconds. Due to such a high shear speed, this type of machine accomplishes a thorough mixing of material in a short time to provide a remarkably high efficiency of operation and, at the same, enables one to build a compact machine for a given job. Furthermore, a continuous mixing machine of the described type displays a superior mixing performance when applied to the mixing of composite materials such as mixtures of synthetic resins with large amounts of inorganic fillers.

Particularly, with the recent development of the synthetic resin industry, resins have come to be used in an increasing assortment of uses. Thus, there have been developed not only new synthetic resins but various blend polymers made up of two or more different synthetic resins and composite materials composed of synthetic resin and various additives. Accordingly, many continuous mixing machines are now required to be variable in residence time, i.e. the time during which the material being mixed is retained within the mixer, so that the longer mixing times required for some types of materials may be provided. As far as such a continuous mixing machine is concerned, the degree of opening of the discharge orifice at the exit end of the machine and the hourly output capacity of the machine are important design considerations but certain problems remain yet to be solved in order to provide the variability of residence time over a sufficiently broad range to adjust for the divergent characteristics of a large variety of materials.

Thus, the operation parameters of this type of continuous mixing machine generally include hourly output, rotational speed of mixing rotors, the degree of opening of the discharge orifice and cooling conditions applicable to the mixing chamber and rotors, and with the output, rotor speed and cooling conditions being held constant, the temperature and the degree of mixing can be adjusted by controlling the degree of opening of the discharge orifice and the relationship between the degree of opening ($\theta$) of the discharge orifice and the residence time of material within the machine as shown in FIG. 2. Thus, as the opening of the discharge orifice is decreased, the consequently increased discharge resistance results in an increased packing density of the material in the machine and a prolonged residence time of the material. The increased residence time means a higher degree of mixing and, hence, an increased temperature of the product. Further, as shown in the diagram of FIG. 2, taking as an example the cases of the outputs $Q_1$ and $Q_2$ ($Q_1 > Q_2$), the residence time can also be increased by decreasing the output but such an approach causes a reduction in the efficiency of the mixer. The residence time may also be increased by increasing the length of the rotors. However, such an attempt will cause an increase in temperature of the material and where there is a limitation on the temperature of material, the degree of opening of the discharge orifice will have to be increased and, therefore, the residence time may not necessarily be increased.

Moreover, there are many cases in which it is more important to achieve uniform mixing than to increase the mean degree of mixing. The problem of fish-eyes in film grades of polyolefin resin and the problem associated with the addition of carbon black are cases in point. Thus, it is of course important to decrease the total number of fish-eyes or the total number of undispersed carbon black particles but if the fish-eyes or carbon particles in excess of certain dimensions are left over even if they are small in quantity, the properties of mixed products will be adversely affected. To prevent such results, it is necessary to ensure a uniform residence time of material within the mixing machine and to preclude the short-pass problem, i.e. the passage of a localized portion of material through the machine substantially without being subjected to shearing work. The conventional continuous mixing machine of this type has this problem of short-pass and, hence, the disadvantage of a variation of residence time.

SUMMARY OF THE INVENTION

It is therefore a primary object of this invention to provide an improved continuous mixing machine which, without sacrificing the productivity and other characteristics, affords not only an increased mean residence time but also a uniform residence time so as to effect a remarkable improvement in the quality of mixed materials.

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

DETAILED DESCRIPTION OF THE PREFERRED EMBODIMENT

Figure 1:
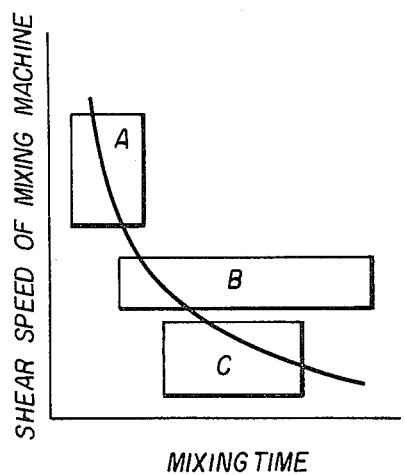
FIG. 1 is a diagrammatic view showing the relationship between the mixing time and shear speed of a mixing machine.
Figure 2:
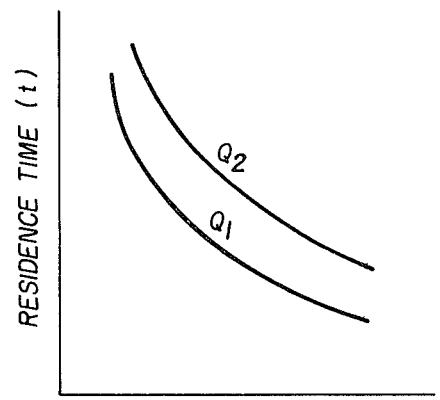
FIG. 2 is a diagrammatic view showing the relationship of the degree of opening of the discharge orifice and the residence time of material in a mixing machine.

This invention specifically relates to a continuous mixing machine including a plurality of rotors each provided with mixing blade members, a mixing chamber encircling the plurality of rotors and a throttle member disposed as defining a part of the mixing chamber and adapted to vary the tangential clearance with respect to outer surfaces of the rotors for varying the free space in the mixing chamber.

Referring to the accompanying drawings which illustrate several preferred embodiments of the present invention, the mixing machine includes first and second rotors (1),(1) each provided with mixing blade members and a mixing chamber (2) encircling the rotors. Each of the rotors (1) includes a screw member (12) for the propulsion of material and a mixing blade (1b). The two rotors (1),(1) are of the non-engaged type and, thus, can be rotated in mutually opposite directions by a suitable driving mechanism. The mixing chamber (2) actually includes a pair of substantially cylinderical parallel chambers communicating with each other. The machine is further provided with a hopper (3) for feeding the material to be mixed at a feeding end of the chamber (2), while the other end of the chamber (2) is provided with a discharge port (5) including a downwardly discharging orifice (4) (hereinafter referred to as the discharge orifice) the degree of opening of which is variable.

The reference numeral (6) denotes a throttle member disposed so as to define a part of the mixing chamber (2) at a suitable intermediate position thereof and facing said rotors (1), (1).

The Throttle member (6) is preferably disposed at the end portion of the first mixing zone which includes feed blade (1X) and return blade (1Y) of rotors (1), (1).

Throttle member (6) is adapted to be driven toward and away from the rotors (1),(1), i.e. in a tangential direction normal to the axial direction of the rotors (1),(1), while maintaining a hermetic seal in association with the remaining portion of the wall defining the mixing chamber (2).

When throttle member (6) is, however, driven toward rotors (1), (1), the minimum clearance t (cm) between throttle member (6) and the rotors (1), (1) should be set to be more than TV DN/1000 wherein D (cm) denotes the diameter of mixing chamber (2) and N denotes the rotational frequency of the rotors (1), (1) (revolution per second), otherwise it may be difficult to provide a thermal control because of the increased heat of the resin.

The inner face of throttle member (6) is configured in the shape of two arcuate surfaces joined in the transverse direction and in generally compensatory relation with the outer peripheral surfaces of rotors (1),(1). Reference numeral (7) denotes a hydraulic cylinder which is mounted over the mixing chamber (2) via a mounting frame (8), a cylinder rod of hydraulic cylinder (7) being connected to throttle member (6) so that the latter may be driven by hydraulic cylinder (7).

Figure 3:
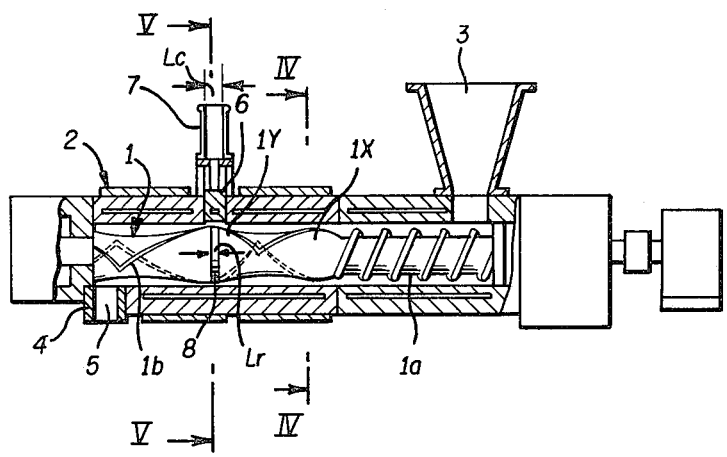
FIG. 3 is an overall longitudinal front elevation view of a mixing machine according to the present invention.
Figure 5:
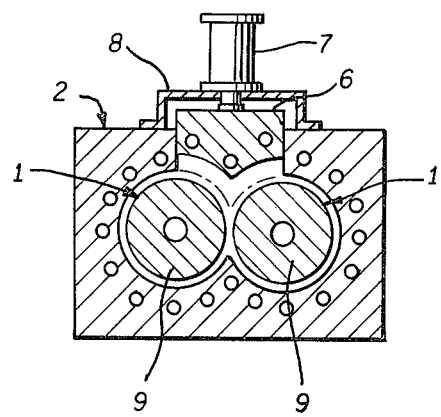
FIG. 5 is an enlarged longitudinal section view taken along the line V—V of FIG. 6.
Figure 6:
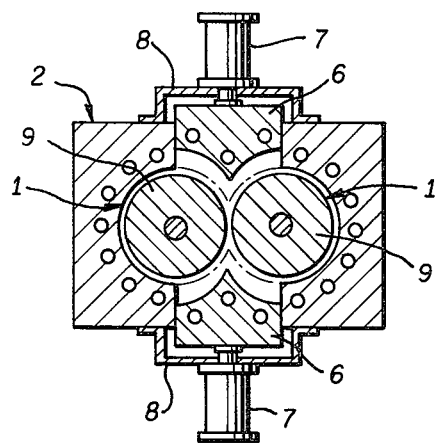
FIGS. 6 and 7 are views respectively showing an embodiment of the throttle member installed in accordance with the present invention.

As illustrated in FIGS. 3 and 5, the throttle member (6) may be provided either in the upper portion of chamber (2) or in the lower portion, or alternatively, a couple of throttle members (6),(6) and the corresponding couple of hydraulic cylinders (7),(7) may be provided at upper and lower portions of mixing chamber (2). The width of throttle member (6) may be varied as desired as, for example, shown in FIG. 7.

Figure 4:
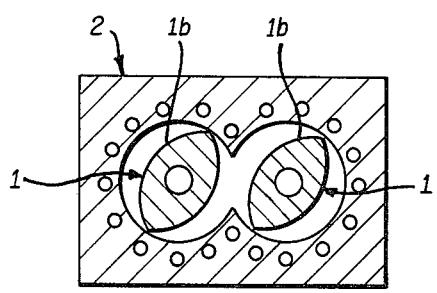
FIG. 4 is an enlarged longitudinal section view taken along the line IV—IV of FIG. 3.
Figure 8:
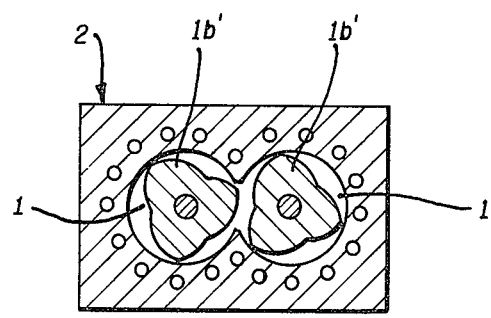
FIG. 8 is an enlarged longitudinal section view showing another version of the mixing arrangement in accordance with the present invention.
Figure 9:
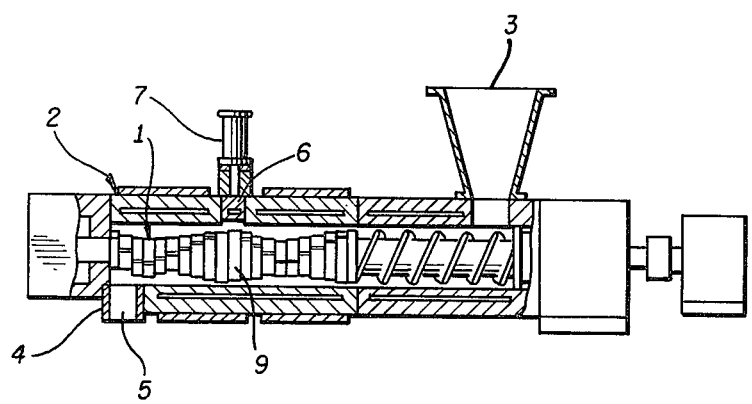
FIG. 9 is an overall longitudinal front view showing another mixing machine embodying the principles of the present invention.

It is preferable that parts (9),(9) of rotors (1),(1) facing throttle member (6) said have a circular cross sectional configuration so that the material is conveyed evenly through the clearance between the inner face of throttle member (6) and the exterior surfaces of rotors (1),(1) and that the flow of material may be controlled by slight movement of throttle member (6). Regarding the cross-sectional configuration of the blades of rotors (1),(1), each is preferably a bidirectional blade (1b) such as shown in FIG. 4 or a tridirectional blade (1b') such as shown in FIG. 8. Thus, the blades of each rotor may be a combination of a blade deflected in the direction of propelling the material toward the discharge end of the mixing machine and a blade deflected in the direction of pushing the material back toward the feeding end or-/and an undeflected blade. The rotor may also be a combination of blades configured as a multiplicity of blocks as illustrated in FIG. 9.

The material supplied continuously and quantitatively from the hopper (3) passes through mixing chamber (2) between the inner wall defining chamber (2) and the surfaces of rotors (1),(1), and is melted and admixed by the revolving rotors (1),(1), followed by the continuous discharge thereof from discharge orifice (4) at discharge port (5). Generally speaking, better mixing is obtained when the residence time of material within the chamber (2) is increased. In the continuous mixing machine of this invention, control of residence time and the degree of mixing can be effected not only by adjusting the degree of opening of the discharge orifice but also by adjusting the dynamic position of throttle member (6). Thus, this invention permits adjustment of residence time over a broad range that has never been realized in the prior art.

Figure 7:
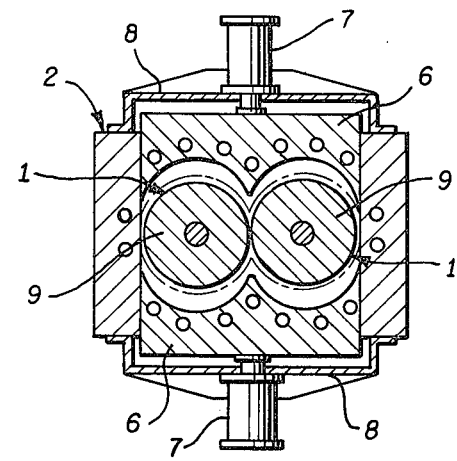
Figure 10:
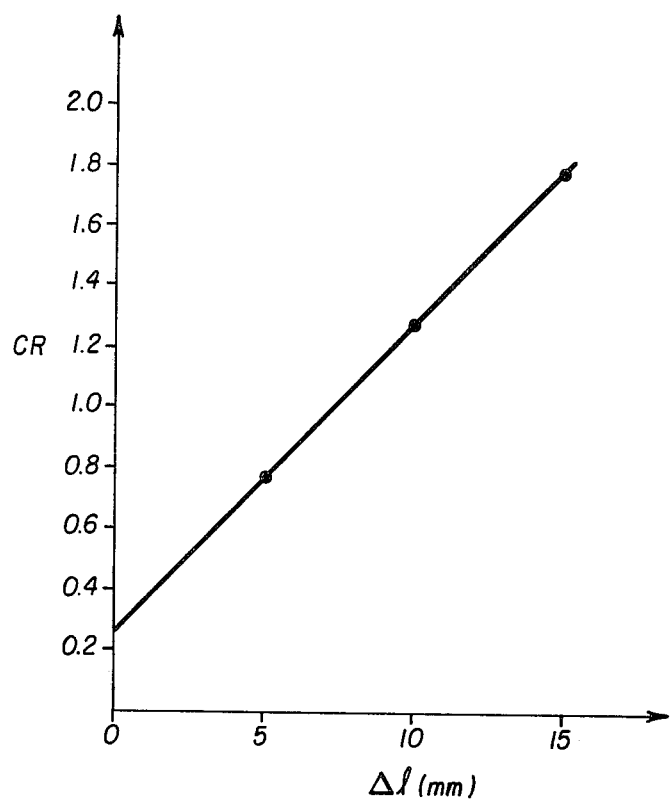
FIG. 10 is a diagram showing the relation of the amount of adjustment of the throttle member with throttle ratio.

In FIG. 10 is shown a diagram showing the relationship between the amount of adjustment of the throttle member (6) and the throttle ratio. In this diagram, the internal cross-sectional area of chamber (2) is designated as $S_c$, the cross-sectional area of rotors (1) as $S_R$, and the cross-sectional area of the free space in mixing chamber (2) through which the material flows as $S_e = S_c - S_R$. The internal sectional area of chamber (2) in the degree of opening of throttle member at the throttling position is defined as $S_{c\Delta l}$, the cross-sectional area of rotors (1) in the throttling position as $S_{R'}$, and the cross-sectional area of the chamber space through which the material flows in the throttling position as $S_{e'} = S_{c\Delta l} - S_{R'}$. Then, the throttle ratio $CR = S_{e'}/S_e$ is determined. The internal diameter of the mixing chamber is, for example, herein assumed to be 50.8 mm, the outer diameter of the rotor being 47.85 mm, and the cross-sectional configuration of the arrangement at the throttling position is as illustrated in FIG. 7. The diagram of FIG. 10 represents the relation of Δl and CR under the above-mentioned conditions.

It will be seen that a slight movement of the throttle member (6) results in a large variation in throttle ratio and that by varying the throttling amount, the mean residence time of material and the degree of mixing can each be varied over a broad range. Furthermore, such a diminution of the free space at this position by means of throttle member (6) not only prolongs the mean residence time of material within the mixing chamber (2) but also prevents occurence of the aforementioned short-pass phenomenon, that is the passage of some localized portion of material substantially without being subjected to shearing work in the mixing chamber (2). In other words, the distribution of residence time above the mean residence time is significantly narrowed in comparison with the case in which such a throttling arrangement is not available.

To achive the objectives of the invention, the ratio (Lc/D) of the width (Lc) of the throttle member (6) to the diameter (D) of mixing chamber (2) is preferably set to be not more than 2.0, more preferably not more than 1.0. Further, the ratio (Lr/D) of the width (Lr) of throttle portion of rotors (1), (1) to the diameter (D) of mixing chamber (2) is preferably set to be not more than 1.2, more preferably not more than 0.6.

Figure 11:
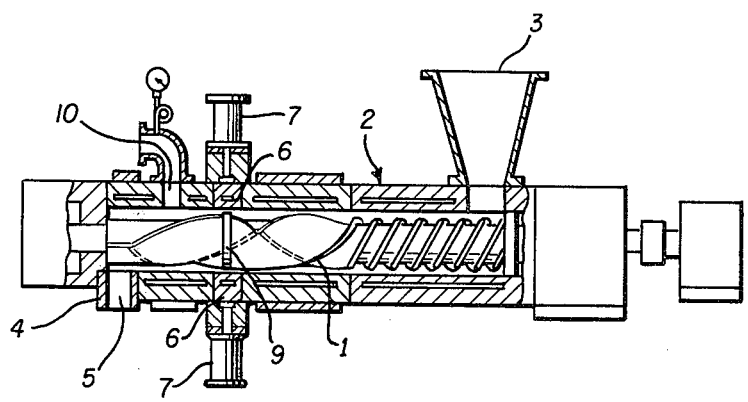
FIG. 11 is an overall longitudinal frontal view showing another embodiment of the mixing machine according to the present invention.

Referring to FIG. 11 which illustrates another embodiment of this invention, mixing chamber (2) is provided with a vent hole (10). This machine is so designed that it is operated with the mixing chamber space being maintained in an evacuated condition by means of vent hole (10) whereby the minute air bubbles and vapor that may contained in the material may be effectively removed. In this embodiment, vent hole (10) is provided at a position displaced from throttle member (6) toward discharge port (5). Since, in the above arrangement, the material itself provides a material seal at the throttling position which is upstream of vent hole (10), adequate evacuation and degassing are achieved without problems.

The mechanism that can be utilized for actuating throttle member (6) is not limited to the hydraulic cylinder (7) but may, for example, be an adjusting screw. Throttle member (6) may also be adjusted manually. The adoption of any given type of actuator as well as the detailed constructions of rotors, mixing chamber, discharge port and other components of the continuous mixing machine according to the present invention can be freely selected by those skilled in the art without departing from the spirit and scope of this invention.

Since the continuous mixing machine according to this invention includes a throttle member as defining part of a mixing chamber in a position facing a couple of rotors and as installed movable toward and away from said rotors so as to vary the cross-sectional area of the chamber space through which the material is caused to pass, the residence time of the material within the mixing machine can be freely varied over a broad range by controlling the position of the throttle member. Moreover, such throttling of the chamber space by throttle member not only allows the mean residence time of material to be considerably increased but provides a narrow residence time distribution by preventing a short time passage of the material, thus contributing to improvements in the quality of mixed products and other advantageous results. The degree of opening of the discharge orifice and the movement of the throttle member may also be associated so to obtain an even more greatly improved mixing result.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A continuous mixing machine for mixing a material fed at one end thereof and discharging the mixed material through a discharge orifice at an opposite end in a continuous operation comprising:
   a plurality of rotors each provided with mixing blade means;
   a mixing chamber encircling said mixing blade means;
   a throttle member hermetically sealed in a wall portion of said mixing chamber defining a part of said mixing chamber at a position facing said blade means; and
   means for moving said throttle means in a direction normal to the axes of said blade means toward and away from the blade means so as to vary the tangential clearance with respect to outer surfaces of said blade means, thereby controlling the space within said mixing chamber.

2. A continuous mixing machine according to claim 1, said mixing chamber including a vent hole in a position intermediate said throttle member and said discharge orifice.

3. A continuous mixing machine according to claim 1, said throttle member having an inner surface cooperatively associated with said outer surfaces of said blade means.

4. A continuous mixing machine according to claim 1, each of said blade means comprising a combination of at least one feed blade deflected in the direction of propelling the material toward the discharge orifice and at least one return blade deflected in the direction of pushing the material back toward the feeding side.

5. A continuous mixing machine according to claim 1, each of said blade means comprising a combination of at least one feed blade deflected in the direction of propelling the material toward the discharge orifice and at least one undeflected return blade.

6. A continuous mixing machine according to claims 4 and 5, said at least one feed blade and return blade comprising a first mixing zone wherein said throttle member is disposed at an end portion of said first mixing zone.

7. A continuous mixing machine according to claim 1 wherein said tangential clearance is at least greater than $\pi DN/1000$ in which D denotes the diameter of the mixing chamber and N denotes the rotational frequency of the rotor.

8. A continuous mixing machine according to claim 1 wherein the ratio of the width of the throttle member to the diameter of the mixing chamber is not greater than 2.0.

9. A continuous mixing machine according to claim 8 wherein said ratio is not greater than 1.0.

10. A continuous mixing machine according to claim 1 wherein the ratio of the width of a throttle portion of the rotor to the diameter of the mixing chamber is not greater than 1.2.

11. A continuous mixing machine according to claim 10 wherein said ratio is not greater than 0.6.

12. A continuous mixing machine according to claim 1, said throttle member further comprising means for controlling the degree of opening of said discharge orifice in association with the position of said throttle member.

* * * * *

UNITED STATES PATENT AND TRADEMARK OFFICE
CERTIFICATE OF CORRECTION

PATENT NO. : 4,332,481

DATED : June 1, 1982

INVENTOR(S) : KIMIO INOUE ET AL.

It is certified that error appears in the above—identified patent and that said Letters Patent is hereby corrected as shown below:

On the title page insert:

[30] -- Foreign Application Priority Data

March 29, 1979 [JP] Japan......54-38079 --

UNITED STATES PATENT AND TRADEMARK OFFICE
CERTIFICATE OF CORRECTION

PATENT NO. : 4,332,481

DATED : June 1, 1982

INVENTOR(S) : KIMIO INOUE ET AL

It is certified that error appears in the above-identified patent and that said Letters Patent is hereby corrected as shown below:

In column 3, line 20, delete "EMBODIMENT" and insert therefor --EMBODIMENTS--;

In column 3, line 53, before "Throttle" delete "The";

In column 3, line 64, before "rotors" delete "the";

In column 3, line 65, delete "TV" and insert therefor --$\pi$--;

In column 4, line 21, delete "said" after "member" and insert therefor --each--;

In column 5, line 23, delete "achive" and insert therefor --achieve--;

UNITED STATES PATENT AND TRADEMARK OFFICE
CERTIFICATE OF CORRECTION

PATENT NO. : 4,332,481

DATED : June 1, 1982

INVENTOR(S) : KIMIO INOUE ET AL

It is certified that error appears in the above-identified patent and that said Letters Patent is hereby corrected as shown below:

In column 5, line 37, before "contained" insert therefor --be--;

In column 5, line 64, before "throttle" insert therefor --the--.

Signed and Sealed this

Twentieth Day of December 1983

[SEAL]

Attest:

GERALD J. MOSSINGHOFF

Attesting Officer     Commissioner of Patents and Trademarks